March 28, 1972    M. E. IORNS ET AL    3,652,755
METHOD OF FORMING REINFORCED CONCRETE STRUCTURE
Filed Jan. 27, 1969    2 Sheets-Sheet 1
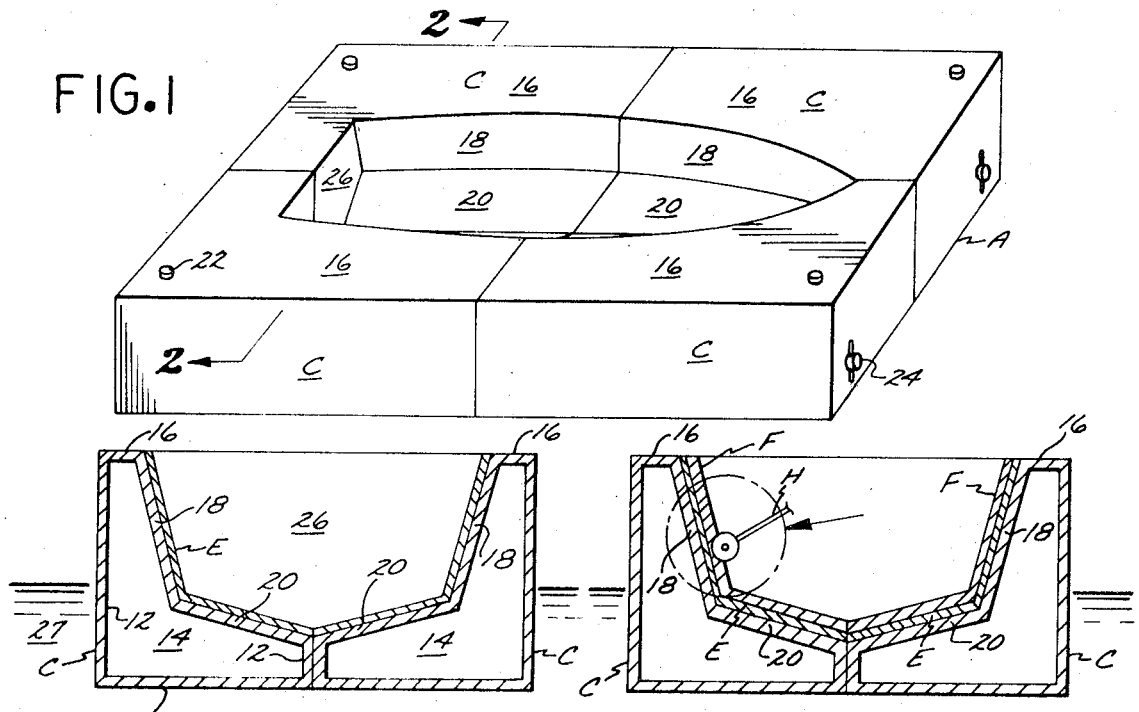
FIG.1
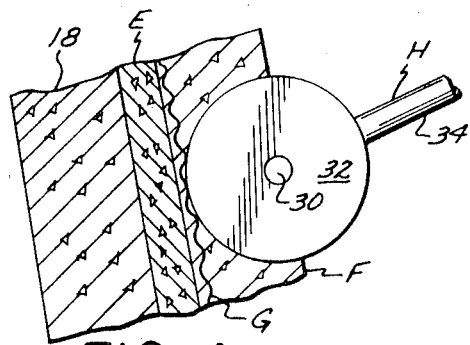
FIG.2
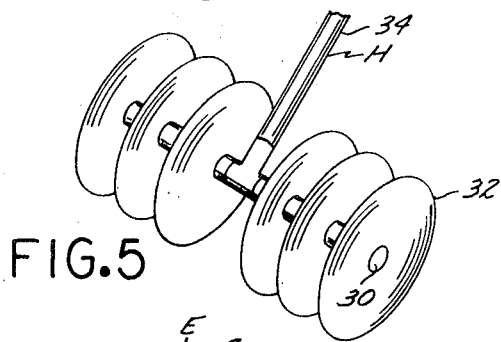
FIG.3
FIG.4
FIG.5
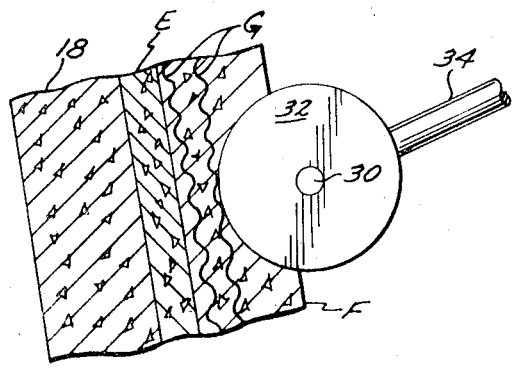
FIG.6
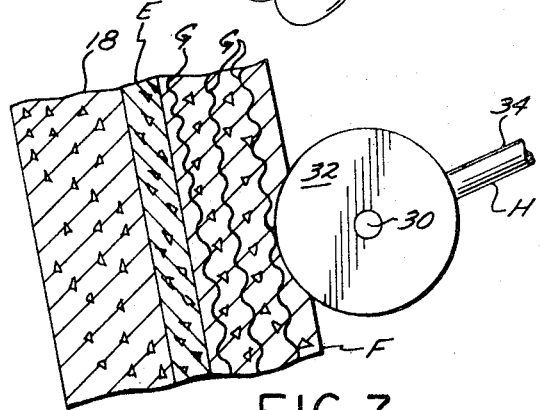
FIG.7
INVENTORS.
MARTIN E. IORNS
LOUIS L. WATSON
BY
William G. Babcock
ATTORNEY March 28, 1972  M. E. IORNS ET AL  3,652,755
METHOD OF FORMING REINFORCED CONCRETE STRUCTURE
Filed Jan. 27, 1969  2 Sheets-Sheet 2
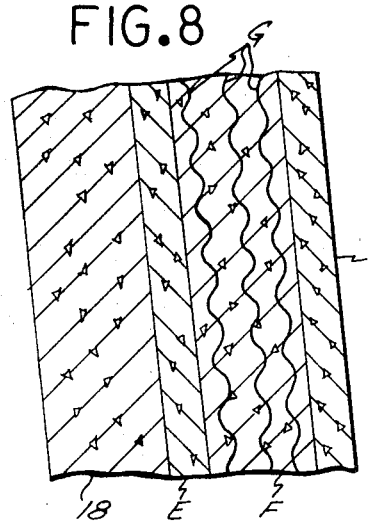
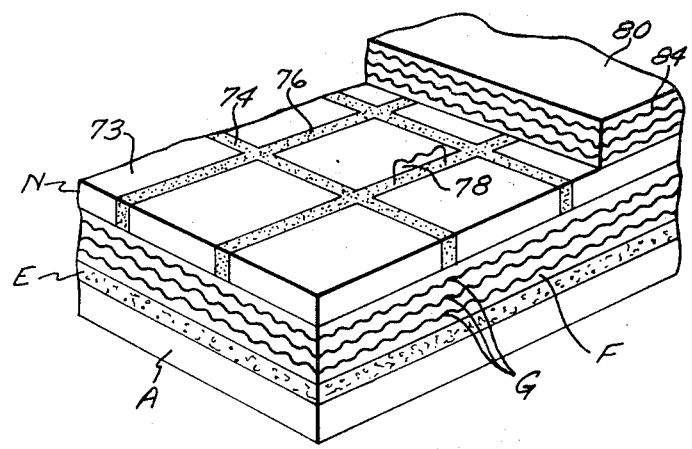
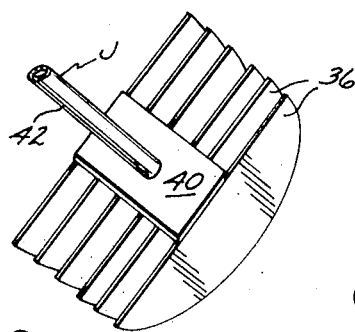
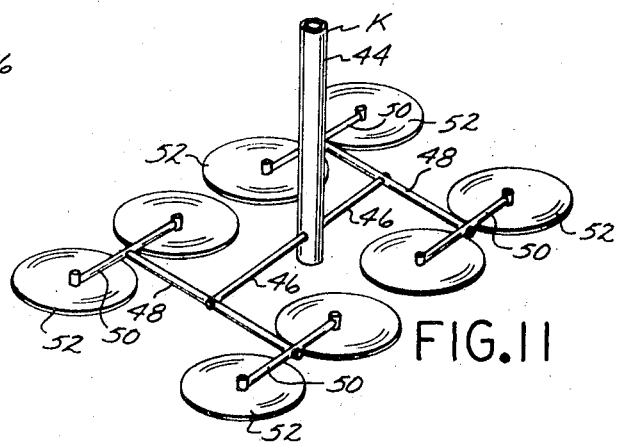
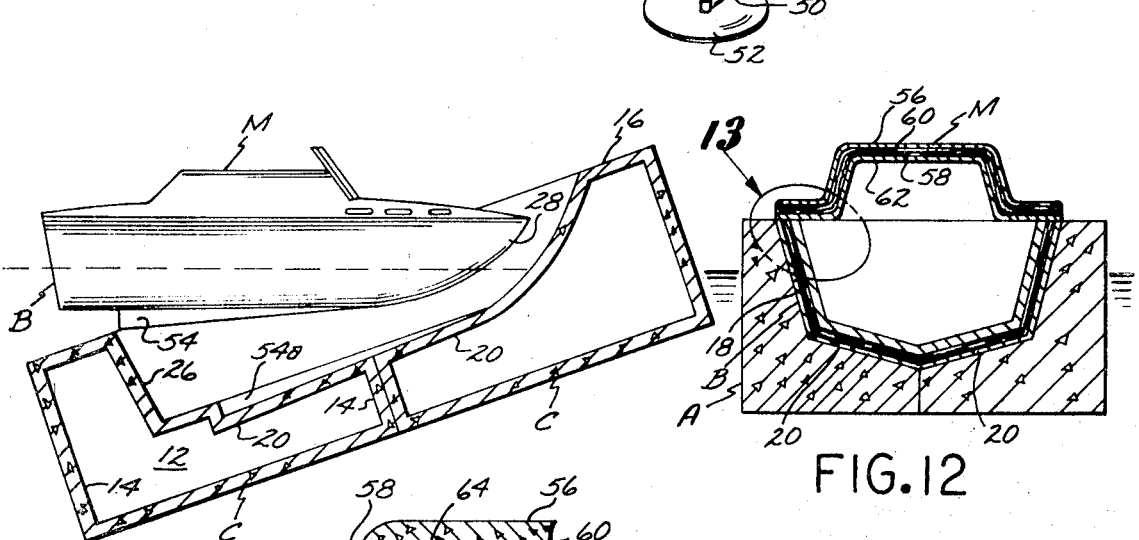
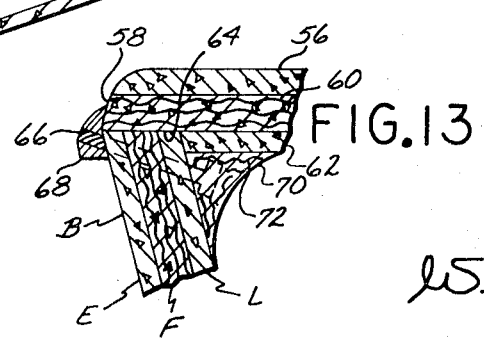
INVENTORS.
MARTIN E. IORNS
LOUIS L. WATSON
BY William Q. Babcock
ATTORNEY

United States Patent Office 3,652,755
Patented Mar. 28, 1972

3,652,755
METHOD OF FORMING REINFORCED CONCRETE STRUCTURE
Martin E. Iorns, 1512 Lakewood Drive, and Louis L. Watson, 1601 Lakewood Drive, both of West Sacramento, Calif. 95691
Filed Jan. 27, 1969, Ser. No. 794,229
Int. Cl. B29d 3/02, 9/02
U.S. Cl. 264—219                                                     1 Claim

ABSTRACT OF THE DISCLOSURE

Method of forming a reinforced hollow marine structure that includes a bottom and upwardly extending side walls by forming a female mold that conforms to the exterior surface thereof, and applying a first cementitious layer to the interior of said mold. A second cementitious layer is applied to the first layer, with first reinforcing means being pressed into the second layer while it is plastic. Reinforcing means so pressed into the second layer is in full surface contact therewith, and maximum strength is obtained therefrom. The marine structure is removed from the mold after the layers have become dimensionally stable.

BACKGROUND OF THE INVENTION

Field of the invention

A method of forming a buoyant marine structure, which structure resulting from the practice of said method is characterized by the bottom and walls thereof that are defined by a plurality of layers of cementitous material, with all of the layers of the material, excepting the outer layer, preferably including reinforcing means that are embedded therein and in full surface contact with a cementitous material most adjacent thereto.

DESCRIPTION OF THE PRIOR ART

In the past, concrete marine structures have been built by forming cementitious material into a first layer that defines the exterior configuration of the structure. Steel reinforcing bars have then been bent, hand tied, and disposed in abutting contact with the interior surface of the first layer. Thereafter, cementitious material has been hand worked, or otherwise applied to envelop the reinforcing bars.

The disadvantages of this prior method have been found in the excessive amount of hand labor involved and the accompanying expense thereof, and the fact that the strength and durability of the resulting marine structure is dependent to a large degree on the skill with which the second layer is applied to the reinforcing bars to not only envelop the same, yet be in surface contact therewith.

The present method eliminates the operational disadvantages of the prior method described in that a much greater quantity of reinforcing can be incorporated into each of the interior layers of the marine structure with the assurance that all reinforcing so used is fully embedded in one of the layers of cementitious material in full surface contact therewith. Due to the increased quantity of reinforcing used, and the full surface contact of the reinforcing with the surrounding cementitious material, a marine structure is provided of much greater strength and durability than prior structures of this type devised heretofore, as well as a marine structure that can be built at a substantial reduction in cost over previously available marine structures of the character described.

SUMMARY OF THE INVENTION

A reinforced concrete marine structure and method of forming same in which a plurality of cementitious layers are consecutively applied one to the other within the confines of a female mold, with each layer, excepting the outer layer, and the finish layer incorporating reinforcing means which have been forced into the confines thereof prior to application of the next layer thereover. The reinforcing means is enveloped by the material defining each layer and in full surface contact therewith.

By use of spaced blocks that are disposed between adjacent layers, and filling in spaces between the blocks with cementitious material and reinforcing, the walls and the bottoms of the marine structure of the present invention may be formed in an egg crate construction of variable density and great strength.

A major object of the present invention is to provide a reinforced concrete structure and method of forming same, in which structure the steel reinforcing may, by weight or volume, exceed limits heretofore attainable, with the assurance that all reinforcing is in full surface contact with the concrete surrounding the same.

Another object of the invention is to provide a method by which reinforcing in the form of heavy woven wire cloth, expanded metal sheeting, welded wire fabrics, perforated metals, solid inserts, or reinforcing bars may be used individually or in combination in desired spacing, in contrast to the severe limitations imposed by prior methods known by which steel reinforced concrete marine structures are formed.

A still further object of the invention is to supply a method of forming marine structures by which the hull thickness thereof may be varied with a minimum of inconvenience and expense.

Yet another object of the invention is to supply a method and marine structure formed by use of the method in which the wall of the marine structure is defined by a number of layers of cementitious material, each of a different composition, with the compositions being so selected as to provide a marine structure of desired physical characteristics.

A further object of the inventon is to furnish a method of forming a concrete marine structure in a mold by which the formed structure is released from the mold with the imposition of minimum stresses on the marine structure.

Yet still another object of the invention is to provide a method of forming a concrete marine structure that eliminates voids in the concrete, with the structure formed by means of said method being of far greater strength than those built by methods available heretofore.

Still a further object of the invention is to supply a method of forming a marine structure by means of which the thickness of the concrete layers and the placement of reinforcing means in the structure may be more closely controlled than with prior available methods.

Another object of the invention is to provide a buoyant marine structure that may be formed by use of lightweight mortars to provide a wall section of variable density, free from brittle failure, one in which the steel reinforcing content is greater than that attainable in prior art concrete structures, is less expensive to produce in that the necessity of hand tying of the reinforcing means is eliminated, and a marine structure requiring little or no hand finishing after separation thereof from the mold in which it is formed.

BRIEF DESCRIPTION OF THE DRAWINGS

FIG. 1 is a perspective view of a compartmented buoyant female float in which a steel reinforced concrete marine structure may be formed;

FIG. 2 is a transverse cross-sectional view of the mold taken on the line 2—2 of FIG. 1, after a first layer of cementitious material has been applied to the interior surface thereof;

FIG. 3 is the same cross-sectional view as shown in FIG. 2, after second layer of cementitious material has been applied to the first layer and showing a tool being used to force reinforcing means into the confines of the second layer;

FIG. 4 is an enlarged fragmentary, transverse, cross-sectional view of a section of the mold and first and second layers, showing the tool forcing a first sheet of reinforcing into the confines of the second layer;

FIG. 5 is a perspective view of a first tool used in forcing reinforcing into the confines of a layer of plastic concrete;

FIG. 6 is the same view as shown in FIG. 4 but with the tool shown forcing a second sheet of reinforcing into the confines of the second layer;

FIG. 7 is the same view as shown in FIG. 4 but with the tool shown forcing a third sheet of reinforcing into the confines of the second layer;

FIG. 8 is another cross-sectional view of the wall of the mold, first and second layers, with three reinforcing means contained within the confines of the second layer, and after a finish coat has been applied to the interior surface of the second layer;

FIG. 9 is a perspective view of a section of the mold, showing an egg crate type section of the marine structure wall formed therein;

FIG. 10 is a perspective view of a second tool used for forcing reinforcing into a layer of cementitious material;

FIG. 11 is a perspective view of a third tool that may be used in forcing large sections of wire mesh or reticulated sheet material into the confines of a layer of cementitious material;

FIG. 12 is a transverse cross-sectional view of the female mold, showing the hull of a marine structure formed by the present method disposed within the confines thereof that includes a combined deck and cabin structure secured to the upper edges thereof;

FIG. 13 is an enlarged fragmentary, transverse, cross-sectional view of a portion of the hull and deck structure, taken within the confines of the phantom circle identified by the numeral 13 in FIG. 12; and FIG. 14 is a longitudinal cross-sectional view of the compartmented mold after it has been partially flooded to tilt downwardly within a body of water and permit a formed concrete marine hull to separate and float free therefrom.

DESCRIPTION OF THE PREFERRED EMBODIMENTS

A buoyant female mold A is shown in FIG. 1 that is adapted for use with the present method in forming a marine structure B such as the hull of a boat illustrated in FIG. 14. The mold A is comprised of hollow, buoyant sections C which are removably held together as an integral unit by conventional means (not shown). Each section C, as may best be seen in FIGS. 2, 3 and 14, includes a bottom 10, two side walls 12, and two end walls 14. The upper edges of the side walls 12 develop into horizontal, inwardly extending deck sections 16 on which workmen may stand during fabrication of the marine structure B, as well as when the structure is separated from the mold A in the manner shown in FIG. 14.

The inner edges of the deck 16 develop into downwardly extending first walls 18 (FIGS. 2 and 3) that are of the same configuration as the side wall of the marine structure B to be formed by the present method. The lower ends of the first walls 18 develop into downwardly and inwardly extending second walls 20 of the same configuration as that of the bottom of the structure B to be formed.

An opening (not shown) is provided in the upper portion of each of the mold sections C, which is closed by a plug 22. When the plug 22 is removed from the opening (not shown), water may be discharged into the confines of the section C associated with that plug to lower the mold A into the water in a predetermined direction. Thus, by admitting water into the different sections C, the mold A may be disposed in a horizontal position on the body of water 27 on which it rests.

When the sections C are assembled in the manner illustrated in FIG. 1, the first and second walls 18 and 20 thereof, together with end walls 26, cooperatively define a cavity D of the configuration of the buoyant marine structure B to be produced, which in the drawings is in the form of a hull.

The method of producing the marine structure B includes the steps of applying a first layer E of cementitious material to the first and second walls 18 and 20 of the sections C, together with the end walls 26 thereof. It will be noted in FIG. 1 that two of the sections C include no end walls, as the first walls 18 in these sections merge to define the bow 28 of the marine structure B. The first layer E may be applied to the exposed surfaces of walls 18, 20, and 26 by being sprayed thereon, or other conventional application means. Inasmuch as the exposed surfaces of the first and second walls 18 and 20, and end walls 26 determine the finsh of the exterior of the hull B, these exposed surfaces should be as smooth as possible to avoid and extensive final finishing work.

After the first layer E has solidified to the extent that it is dimensionally stable, a second layer F of cementitious material is applied thereto by spraying, or the like. While the second layer F is still in plastic state, first reinforcing means G is forced thereinto to the extent that it is completely enveloped by the cementitious material and in full surface contact therewith.

The fiirst reinforcing means G may be wire mesh, reticulated sheet material, or the like. Reinforcing means G my be forced into the second layer F by use of the first tool H shown in FIG. 5, or the second tool J illustrated in FIG. 10. A third tool K is illustrated in FIG. 11 that is useful in forcing large sheets of wire mesh or reticulated metal comprising the first reinforcing means G into the second layer F. Tool K is used for the most part in the construction of large hulls of fifty feet or longer with a vibrator attached.

First tool H includes an elongate shaft 30 that rotatably supports a number of spaced discs 32, and a handle 34 extends upwardly from the center of the shaft 30. By means of the handle 34, the discs 32 may be manually guided and rolled across the reinforcing means G to force the same into the confines of the second layer F as shown in FIG. 4. The discs 32 are quite thin, and the grooves (not shown) formed in the cementitious material of second layer F by these discs as they move therethrough immediately seal, due to the plastic or semifluid state of the material. First tool H may be used to force second and third layers of the first reinforcing means G into the first layer F, as shown in FIGS. 6 and 7.

After the first reinforcing means G has been embedded in the second layer F, a finished coat L is preferably applied to the exposed surfaces of the second layer. Application of the finish coat L is at the discretion of the builder, and is primarily for the sake of appearance, inasmuch as the first reinforcing means G is completely embedded in the second layer F, and is protected against corrosion by the second layer.

The strength of the marine structure B built by the above described method results from the high percentage by weight of reinforcing means G that may be incorporated into the second layer F, and the complete surface contact that is effected between the reinforcing means and the cementitious material comprising the second layer. Due to the reinforcing means G being forced into the plastic cementitious material of the second layer F, there are no voids or air bubbles in the second layer adjacent the reinforcing means. Such voids or air bubbles diminish the area of contact between reinforcing and cement in prior concrete marine structures of the character described, and substantially lessen the strength and durability of the material from which prior marine structures have been fabricated.

The second tool J, as shown in FIG. 10, includes a number of spaced, parallel, arcuate segments 36, the straight edges 38 of which are secured to a cross piece 40. A handle 42 extends outwardly from cross piece 40. The tool J is used to force first reinforcing means G into the second layer F in much the same manner as when the first tool H is employed for this purpose.

Third tool K includes an elongate handle 44 from the end of which an elongate rigid member 46 is pivotally supported. The member 46 pivotally supports two spaced, parallel arms 48 that pivotally support second arms 50 on the ends thereof. Each of the second arms 50 pivotally supports a pair of cylindrical bodies 52 from the end thereof. The group of cylindrical bodies 52 may pivot independently of one another, and are particularly useful in forcing the first reinforcing means G into a second layer F of curved configuration. If desired, a power-driven vibrator head (not shown) may be secured to the handle to assist in forcing reinforcing means G into the second layer F.

After formation of the marine structure B in the manner described, the marine structure is conveniently separated from the mold A by discharging water into the rear compartment C to tilt the mold (FIG. 4). When the mold A so tilts, the marine structure B separates therefrom and floats free therefrom. If desired, a valve controlled opening (not shown) may be incorporated with one of the sections C to permit water or air to be discharged between the marine structure B and mold A to cause separation of the former from the latter.

Water may be discharged into the rear compartments C by removing either the plugs 24 or 22 from the openings which they normally close. After the mold A has been tilted, and the marine structure B has been separated therefrom, air may be discharged into the openings normally closed by the plugs 22 to eject the water in the compartments C through the openings from which the plugs 24 have been removed. A keel 54 may be formed as an integral part of the marine structure B by forming a suitable cavity 54a in the second wall 20, as shown in FIG. 14.

After the structure B has been formed, a prefabricated combination deck and cabin M may be mounted thereon as shown in FIGS. 12 to 14. The deck and cabin M may be formed in a female mold (not shown) in the same manner as with the structure B, and includes a first layer 56 of cementitous material that is bonded to a second layer 58 of the same material in which reinforcing means 60 is embedded. The third layer 62 of cementitious material is bonded to the exposed surface of the second layer 58 and cooperates therewith to define a continuous peripheral recess 64 that engages the upper side portions of the marine structure B shown in FIG. 13.

If desired, the second and third layers 58 and 62, respectively, may be formed as an integral unit. A number of longitudinally spaced bolts or screws 66 are provided which extend outwardly through the upper side wall portions of structure B, and fasteners 68 are mounted on these screws. The fasteners 68 are in gripping engagement with the longitudinally extending side edges of the combined deck and cabin M. The upper interior surfaces of the finish coat L and the adjoining surfaces of the third layer 62 have a longitudinally extending strip of cementitious material 70 adhered thereto that contains reinforcing means 72.

The strip 70, as may be seen in FIG. 13, completely envelops the ends of the bolts or screws 66 and serves as a seal between the hull of the marine structure B, and the combined deck and cabin M secured thereto as above described. If desired, the whole structure B may be defined by a wall N of an egg crate construction as shown in FIG. 9. The wall N (FIG. 9) includes a first layer E of cementitious material to which a second layer F of substantially the same material is bonded, and reinforcing means G is embedded in the second layer.

A number of blocks 73 of a lightweight material such as foam concrete, foam glass, organic foam, styrofoam, or the like, are laid in spaced relationship on the second layer F. Also, hollow blocks 73 and blocks with a core of honeycomb or expanded material may be used if desired. The spaces 74 between the blocks 73 are filled with a cementitous material 76 in which flat reinforcing means 78 are partially embedded, with the reinforcing means preferably extending upwardly above the blocks. A third layer of cementitious material 80 is applied over the exposed surfaces of the blocks 73 and the upwardly projecting portions of the reinforcing means 78 are embedded therein.

Reinforcing means 84 such as wire mesh, reticulated sheet material, or the like, is forced downwardly into the confines of the cementitious material of the third layer 80 while the material is still in the plastic state, as described in connection with the placement of reinforcing means G in the second layer M. After the completion of this operation, the second layer G and the third layer F are bonded to a lattice or web of cementitious material disposed in the spaces 74, whereby the resulting wall, in addition to being light in weight, is sufficiently strong to withstand the longitudinal and lateral forces to which it will be subjected.

The marine structure B resulting from the practice of the present method is used in the same manner as a marine structure of the same shape and size built by conventional means. Although the upper portion of the marine structure B shown in the drawings, as covered by a combined deck and cabin M, it will be obvious that the cabin portion may be omitted therefrom, and the covering is simply by a flat deck.

We claim:

1. A method of forming a hollow cementitious marine structure that has metallic reinforcing means internally disposed therein to obtain a structure of maximum strength, said method comprising the following steps:

(a) forming a female mold, the interior surface of which conforms to the external surface of said marine structure;

(b) applying a first layer of cementitious material to said interior surface of said mold by spraying said material thereon;

(c) applying a second layer of cementitious material to said first layer;

(d) overlying said second layer of said cementitious material while it is still in a plastic state with said reinforcing means;

(e) exerting a force on said reinforcing means by a plurality of thin laterally spaced rigid surface defining members in a direction that said reinforcing means is moved into the interior of said second layer to be completely enveloped thereby and in full surface contact therewith;

(f) withdrawing said rigid surface defining members from contact with said reinforcing means, with openings formed in said second layer by said rigid surface defining members as they moved reinforcing means thereinto immediately sealing due to the plastic state of said second layer; and (g) removing said marine structure from said mold after said first and second layers have set sufficiently as to be dimensionially stable.

(References on following page)

References Cited

UNITED STATES PATENTS

| | | | |
|---|---|---|---|
| 1,597,163 | 8/1926 | Krump | 264—34 |
| 2,454,403 | 11/1948 | Palmieri | 114—65.1 |
| 3,013,922 | 12/1961 | Fisher | 264—261 X |
| 3,212,106 | 10/1965 | Noel | 264—250 X |
| 3,236,015 | 2/1966 | Rubenstein | 264—261 X |
| 3,426,109 | 2/1969 | Dompster | 264—250 X |
| 3,461,009 | 8/1969 | Snyder | 264—250 X |
| 3,306,956 | 2/1967 | Barnette | 264—316 X |

ROBERT F. WHITE, Primary Examiner

R. R. KUCIA, Assistant Examiner

U.S. Cl. X.R.

9—6; 114—65.1; 264—34, 35, 250